(No Model.)
E. BERRY & H. LAMBERT.
BUNDLE BINDER
No. 404,155. Patented May 28, 1889.
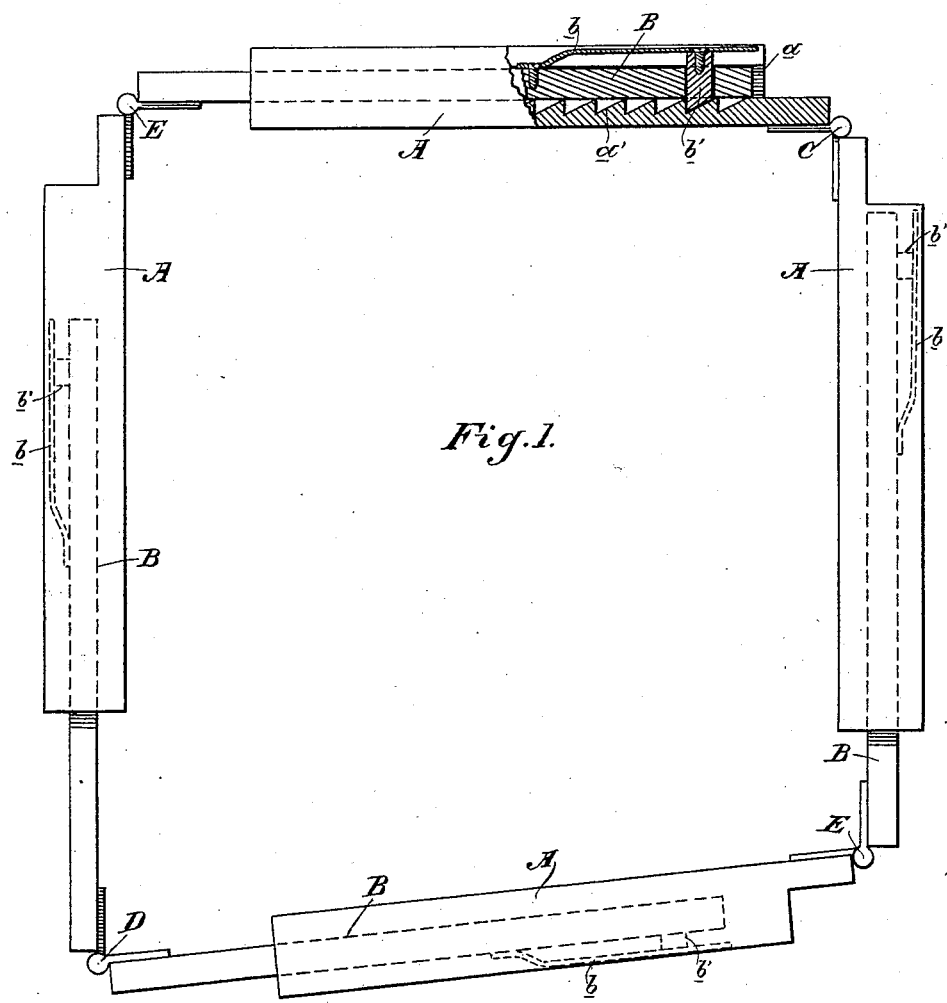
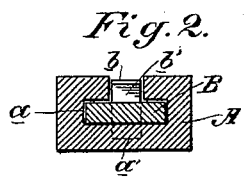
Witnesses,
Geo. H. Strong.
J. H. Rouse,
Inventors,
Eugene Berry
Homer Lambert
By Dewey & Co.
atty (No Model.)
C. H. BILL.
SCUFFLE HOE.
No. 404,156. Patented May 28, 1889.
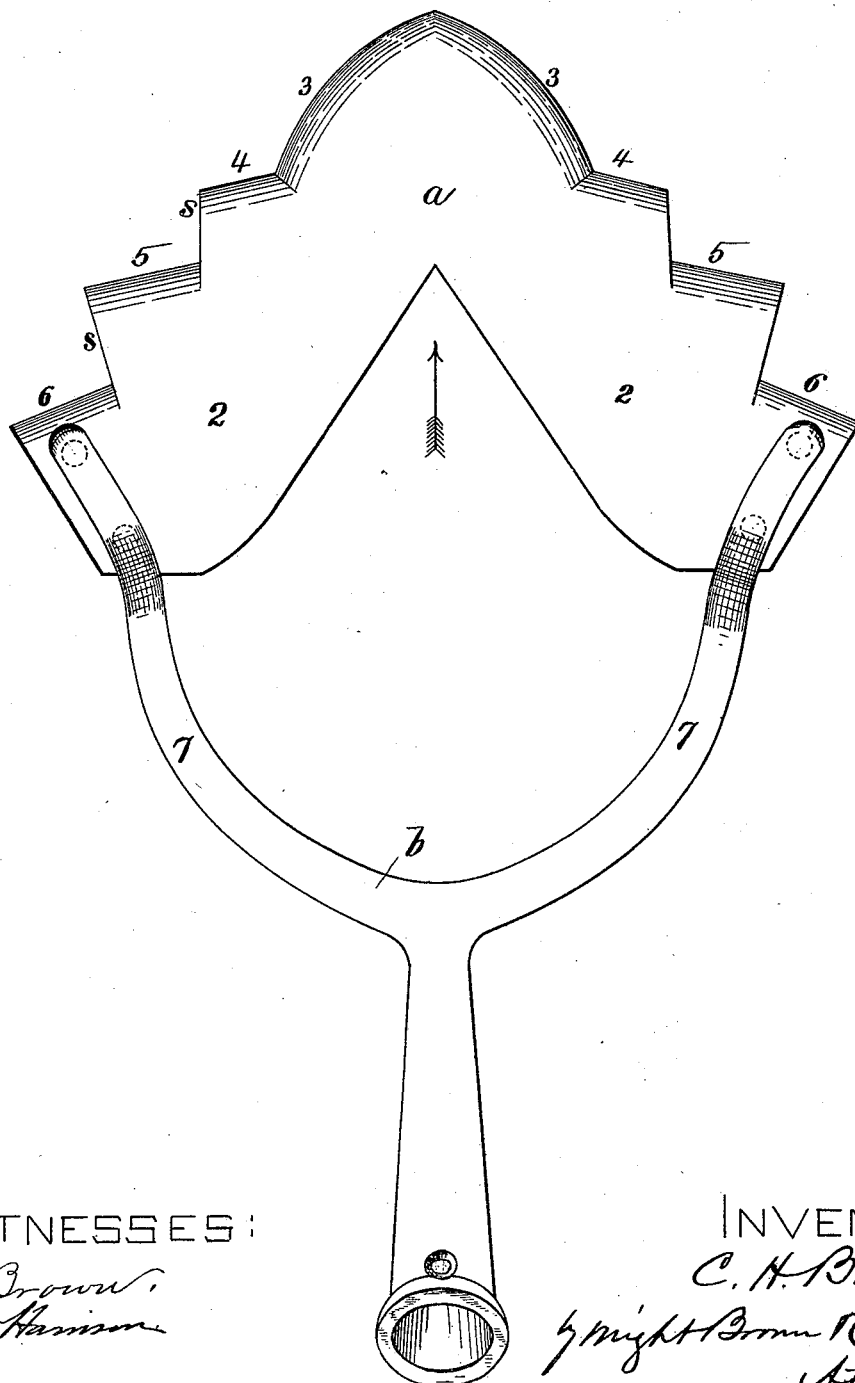
WITNESSES:
H. Brown,
A. D. Harrison
INVENTOR.
C. H. Bill